Dec. 18, 1962 H. J. NULICK 3,068,738
CONNECTOR PLATE HAVING TAPERED TEETH
Filed April 16, 1959
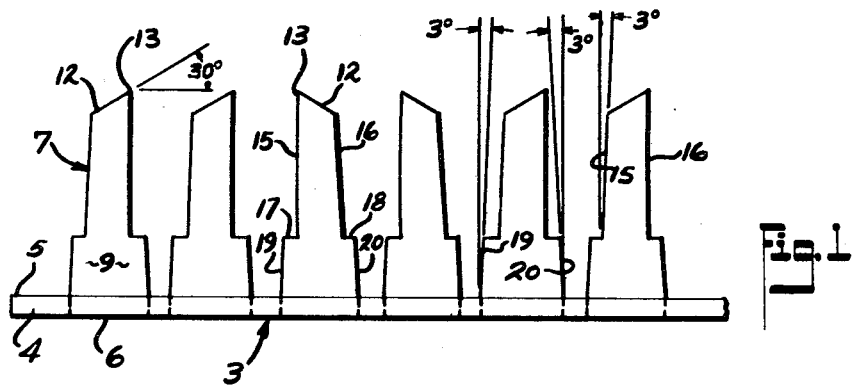
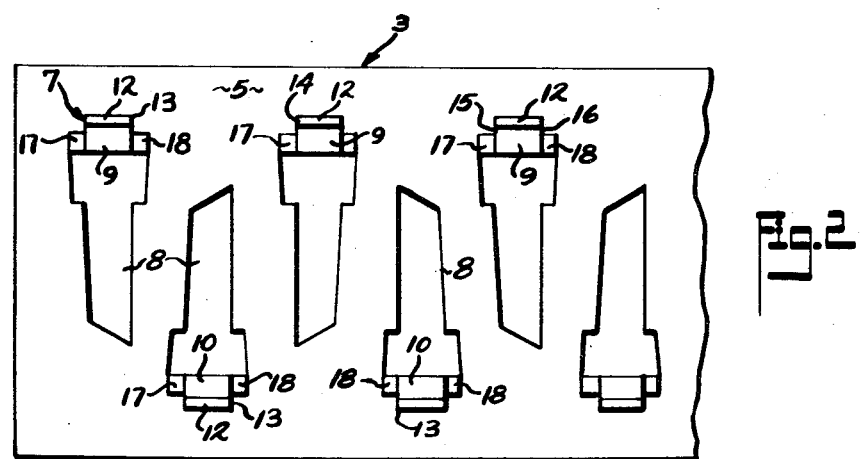
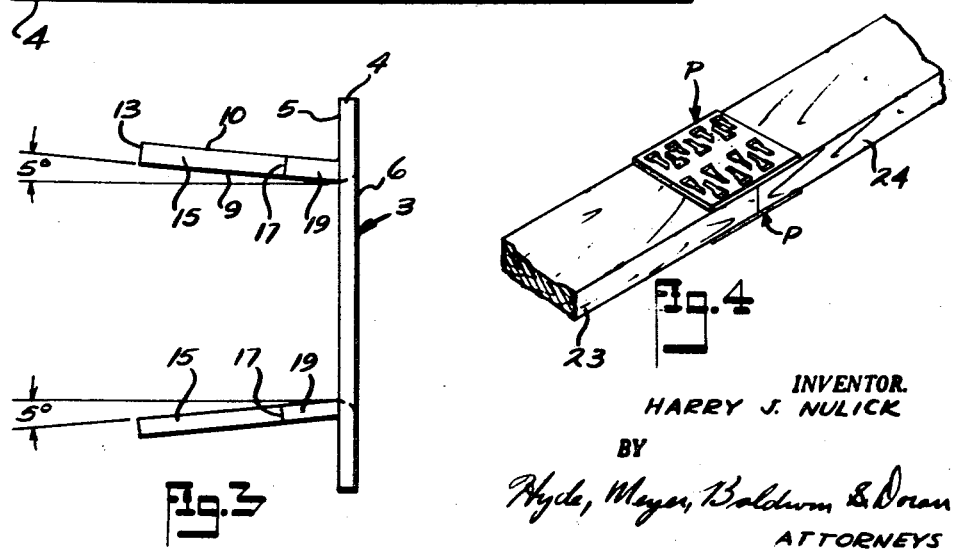
INVENTOR.
HARRY J. NULICK
BY
Hyde, Meyer, Baldwin & Doran
ATTORNEYS 3,068,738
CONNECTOR PLATE HAVING TAPERED TEETH
Harry J. Nulick, Euclid, Ohio, assignor to Penhurst Machine Company, Wickliffe, Ohio, a corporation of Ohio
Filed Apr. 16, 1959, Ser. No. 806,819
1 Claim. (Cl. 85—13)

This invention relates to a wooden truss assembly and more particularly to a new and improved connector plate especially designed to securely fasten two or more abutting members of said assembly together to thus provide a load transmitting joint for said assembly.

A primary object of the present invention is the provision of a new and improved connector plate especially designed for use with a wooden structural truss, and wherein said connector plate is provided with a plurality of teeth adapted to be driven into two or more abutting members of said truss to thus securely fasten the same together and thereby provide a load transmitting joint for said truss.

Another object of the present invention is the provision of a new and improved connector plate as is defined in the above object and wherein the piercing portion of each of the teeth on said plate is of minimum dimension at the point thereof intended for initial penetration and thence progressively increases in said dimension longitudinally therealong to thus provide a maximum tooth dimension closest to the body of said connector plate.

Other objects and advantages of the connector plate of the present invention will be realized by one skilled in the art to which it pertains and upon reference to the following description of a preferred embodiment of said plate, and as is disclosed in the drawings accompanying this specification included as a part hereof, and wherein:

FIG. 1 is a fragmentary side elevational of the connector plate embodying the concepts of the present invention and showing the side configuration of each of the teeth thereof;

FIG. 2 is a plan view of the connector plate of FIG. 1;

FIG. 3 is an end view of the connector plate of FIG. 1, showing the end configuration of each of the teeth of said plate; and FIG. 4 is a fragmentary perspective view of two abutting wooden members of a structural truss using a connector plate embodying the concepts of the present invention on each of the opposed surfaces of said members and thus securing the abutted ends of said members together.

Referring now to the drawings, throughout which like elements are identified by the same reference numeral, the connector plate of the present invention, as identified in its entirety by the reference numeral 3, comprises a flat body 4 formed of a suitable metallic material such as steel and defining thereby opposed parallel faces 5 and 6.

Said plate also includes a plurality of teeth 7 somewhat nail-like in appearance and disposed in at least two spaced rows as is shown particularly in FIG. 2. Said rows of teeth are struck from the aforesaid body 4 so as to project outwardly from the face 5 thereof, defining, by said striking, a single staggered row of spaced slots 8 extending longitudinally along said body.

Each of the formed teeth is seen to have parallel faces 9 and 10 which are thus spaced apart a distance substantially equal to the thickness of the plate body 4.

As is seen particularly in FIG. 3, each of said teeth 7 is also preferably struck from the aforesaid body 4 so as to extend outwardly from the face 5 in such manner as to locate the tooth face 9 and hence said tooth in a plane that is inclined at least 5 degrees from a plane normal to said body face 5. The intended purpose for this particular inclination for said teeth is that upon being driven into a wooden structural member of a truss, such as is shown in FIG. 4, each of said teeth pierce one of said members at a point laterally spaced from the slot 8 defined thereby, thus leaving a non pierced portion of said member directly under the said slot. In this manner, the formation of any open breaks or the like is prevented in said member as a result of attaching said plate, which breaks could possibly collect moisture or other foreign substances and thus weaken the wooden material to thereby decrease the load carrying capacity for said truss.

As is also seen in FIG. 1, each of the teeth 7 is so formed that the width thereof is of minimum dimension at the free end thereof, the end extremity being, in turn, as identified by the reference numeral 12, inclined upwardly at preferably 30 degrees from the plane of the body face 5 to thus terminate in a piercing point 13.

Each of said teeth is also seen to be of stepped configuration, the opposed edge surfaces thereof, as indicated at 15 and 16 terminating at one end with the aforesaid end extremity and at the opposite ends respectively with one end of a shoulder 17 and 18, each of which in turn is substantially parallel to the plane of the body face 5. The opposite end of each of said shoulders 17 and 18 merges respectively with one end of an edge surface 19 and 20, the latter defining the portion of the tooth configuration having the greatest width, and thus merging at the opposite ends thereof with the aforesaid body faces 5 and 6.

As is also best seen in FIG. 1, the edge surfaces 15 and 19 are inclined at least 3 degrees to the right from a plane that is normal to the plane of the body face 5, whereas the edge surface 20 of each tooth is inclined at least 3 degrees to the left of said normal plane.

With this particular construction, each of said teeth is seen to be of minimum dimension at the piercing end thereof and is thence seen to progressively increase in dimension toward the aforesaid body 4.

In this manner, each of said teeth as it is being driven into the wooden member, firmly engages the same throughout the tooth length. As is also to be realized, each of the shoulders 17 and 18 of each tooth tends to press the wood fibers directly in front thereof, as the said tooth is being driven into the wood member, against the tooth surfaces 15 and 16 to thus secure said tooth more firmly within the said member.

With reference directed now to FIG. 4, there is herein shown a part of a typical wooden truss assembly comprising wooden members 23 and 24 disposed in end abutting relation one with the other, and being securely held together to thus form a structural load transmitting joint for said assemby, by means of a pair of plates embodying the concepts of the present invention and which are identified by the reference character P.

Each of said plates is seen to have four rows of said teeth 7 being formed in an identical manner to that as above described, said teeth being struck from the plate body to thus define two staggered rows of slots 8. One of said plates is disposed on each side of the abutting members, preferably one half of each plate lying over the surface of one of the members adjoining its end and thence said plate is driven, by any suitable means, into said members such that the plate body 4 lies against the pierced surfaces of said members.

In this manner, said wooden members 23 and 24 are securely held in abutting relation to each other and said plates overlap each of the abutting ends thereof to thus enable a structural load to be transmitted therebeween.

Having thus described in detail a preferred embodiment of connector plate of the present invention it is to be realized that the construction and arrangement of components thereof may be changed without departing from the inventive concepts as are defined in the appended claim.

What is claimed is:

A structural connector plate comprising a generally rectangular body having oppositely disposed long and short sides and a substantially flat face, at least two rows of spaced teeth struck from said body transversely of the long sides thereof extending outwardly from said flat face and defining staggered rows of spaced transversely extending slots, each of said teeth having a pointed end and being inclined laterally of its associated slot at an angle of at least 5 degrees from a plane normal to the plane of said flat face of said body, adjacent teeth being inclined in opposite directions to each other and toward the long side adjacent thereto, each of said teeth having opposed flat front and rear surfaces disposed parallel to the long sides of said body, each longitudinal side edge of each tooth comprising two longitudinally extending surfaces disposed in transverse spaced relation to each other and to the axis of said tooth, a shoulder formed on each side edge of each tooth intermediate said surfaces and extending perpendicularly to said axis, one end of one of said surfaces on each side of said tooth connecting with said pointed end and at its opposite end with the inner edge of the shoulder adjacent thereto, one end of the other of said surfaces on each side edge of each tooth connecting with the outer edge of said adjacent shoulder and at its opposite end with said body face, said one surface on at least one side edge of said tooth diverging outwardly from said pointed end at least 3 degrees from said axis, and each of said other of said surfaces diverging outwardly from said outer edge of its connected shoulder at least 3 degrees from said tooth axis.

References Cited in the file of this patent

UNITED STATES PATENTS

| | | |
|---|---|---|
| 2,325,766 | Gisondi | Aug. 3, 1943 |
| 2,339,841 | Deuchler | Jan. 25, 1944 |
| 2,349,547 | Gisondi | May 23, 1944 |
| 2,417,423 | Lang | Mar. 18, 1947 |
| 2,877,520 | Jureit | Mar. 17, 1959 |

FOREIGN PATENTS

| | | |
|---|---|---|
| 385,410 | Germany | Dec. 7, 1923 |
| 9457/27 | Australia | Feb. 3, 1928 |
| 194,803 | Switzerland | Apr. 1, 1938 |